US012521857B2

(12) United States Patent
Zhang et al.

(10) Patent No.: US 12,521,857 B2
(45) Date of Patent: Jan. 13, 2026

(54) NAIL GUN

(71) Applicant: Nanjing Chervon Industry Co., Ltd., Nanjing (CN)

(72) Inventors: Junliu Zhang, Nanjing (CN); Chengyu Zheng, Nanjing (CN); Jingdong Hao, Nanjing (CN); Xiaoyong Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 40 days.

(21) Appl. No.: 18/424,343

(22) Filed: Jan. 26, 2024

(65) Prior Publication Data

US 2024/0246211 A1 Jul. 25, 2024

Related U.S. Application Data

(63) Continuation of application No. PCT/CN2022/106951, filed on Jul. 21, 2022.

(30) Foreign Application Priority Data

Aug. 25, 2021 (CN) ......................... 202110978744.0
Sep. 29, 2021 (CN) ......................... 202111148196.5

(51) Int. Cl.
*B25C 1/04* (2006.01)
*B25C 1/00* (2006.01)

(52) U.S. Cl.
CPC .............. *B25C 1/043* (2013.01); *B25C 1/005* (2013.01)

(58) Field of Classification Search
None
See application file for complete search history.

(56) References Cited

U.S. PATENT DOCUMENTS 10,843,317 B2 11/2020 Sato
2006/0180631 A1* 8/2006 Pedicini .................... B25C 1/06 227/8

(Continued)

FOREIGN PATENT DOCUMENTS

CN 105289792 A 4/2018
CN 211220544 U 8/2020

(Continued)

OTHER PUBLICATIONS

International Search Report and Written Opinion of international application No. PCT/CN2022/106951, mailed Sep. 28, 2022, 13 pp.

(Continued)

*Primary Examiner* — Chinyere J Rushing-Tucker
(74) *Attorney, Agent, or Firm* — Greenberg Traurig, LLP

(57) ABSTRACT

A nail gun includes: a housing formed with an accommodating space; a cylinder; a firing assembly capable of moving from an initial position to a firing position; a power output assembly disposed in the accommodating space and used for outputting a driving force; and a drive wheel connected to an output shaft of the power output assembly and used for driving, under the drive of the power output assembly, the firing assembly to move. The drive wheel has a first drive tooth and second drive teeth, the radius of the addendum circle of the first drive tooth is less than the radius of the addendum circle of a second drive tooth, the first drive tooth is a drive tooth disposed at a start end of the drive wheel, and the first drive tooth meshes with the firing assembly when the drive wheel starts driving the firing assembly to reset.

15 Claims, 18 Drawing Sheets

(56) References Cited

U.S. PATENT DOCUMENTS

| | | | | |
|---|---|---|---|---|
| 2009/0090762 | A1 | 4/2009 | Leimbach | |
| 2012/0118932 | A1 | 5/2012 | Largo | |
| 2016/0229043 | A1 | 8/2016 | Wyler | |
| 2019/0126452 | A1 | 5/2019 | Po | |
| 2019/0202042 | A1 | 7/2019 | Wu | |
| 2020/0338708 | A1 | 10/2020 | Po | |
| 2021/0101272 | A1* | 4/2021 | Saitou | B25C 1/047 |

FOREIGN PATENT DOCUMENTS

| | | | |
|---|---|---|---|
| CN | 113070849 | A | 7/2021 |
| CN | 214055139 | U | 8/2021 |
| CN | 111791187 | A | 6/2023 |
| WO | 2021003972 | A1 | 1/2021 |

OTHER PUBLICATIONS

Office Action from Canadian application No. 3,229,951, dated Jul. 15, 2025, 5 pp.

* cited by examiner

NAIL GUN

RELATED APPLICATION INFORMATION

This application is a continuation of International Application Number PCT/CN2022/106951, filed on Jul. 21, 2022, through which this application also claims the benefit under 35 U.S.C. § 119(a) of Chinese Patent Application No. 202110978744.0, filed on Aug. 25, 2021, and Chinese Patent Application No. 202111148196.5, filed on Sep. 29, 2021, which applications are incorporated herein by reference in their entireties.

TECHNICAL FIELD

The present application relates to a nail gun.

BACKGROUND

Nail guns in the market may be classified as mechanical nail guns and cylinder-type nail guns according to a principle manner. For a cylinder-type nail gun, gases in a cylinder push out a firing assembly so that a nailing action is performed. The process may be defined as one nailing cycle where the firing assembly moves from an initial position in the cylinder to a firing position and then moves from the firing position to the initial position. Generally, after a nail is driven out, a firing pin of the firing assembly rebounds for a short distance under the action of a rebound force, so a transmission tooth of the firing pin impacts a drive tooth of a drive wheel. As time passes, the drive tooth or the transmission tooth will be seriously abraded. As a result, the service life of the machine is affected.

SUMMARY

The present application discloses a nail gun. The nail gun includes: a housing formed with an accommodating space; a cylinder connected to the housing and used for storing gases; a firing assembly at least partially disposed in the cylinder and capable of moving from an initial position to a firing position in the cylinder to drive a nail out; a power output assembly disposed in the accommodating space formed by the housing and used for outputting a driving force to drive the firing assembly to move in the cylinder; and a drive wheel connected to an output shaft of the power output assembly and used for driving, under the drive of the power output assembly, the firing assembly to move in the cylinder. The drive wheel has a first drive tooth and second drive teeth, where the radius of the addendum circle of the first drive tooth is less than the radius of the addendum circle of a second drive tooth, the first drive tooth is a drive tooth disposed at a start end of the drive wheel, and the first drive tooth meshes with the firing assembly when the drive wheel starts driving the firing assembly to reset.

The present application discloses a nail gun. The nail gun includes: a housing formed with an accommodating space; a cylinder connected to the housing and used for storing gases; a firing assembly at least partially disposed in the cylinder and capable of moving from an initial position to a firing position in the cylinder to drive a nail out; a power output assembly disposed in the accommodating space and used for outputting a driving force to drive the firing assembly to move in the cylinder; and a drive wheel connected to an output shaft of the power output assembly and used for driving, under the drive of the power output assembly, the firing assembly to move in the cylinder. The drive wheel has a first drive tooth and second drive teeth, where the ratio of the radius of the addendum circle of the first drive tooth to the radius of the addendum circle of the second drive tooth is higher than or equal to 0.5 and lower than 1, the first drive tooth is a drive tooth disposed at a start end of the drive wheel, and the first drive tooth meshes with the firing assembly when the drive wheel starts driving the firing assembly to reset.

DETAILED DESCRIPTION

Figure 1:
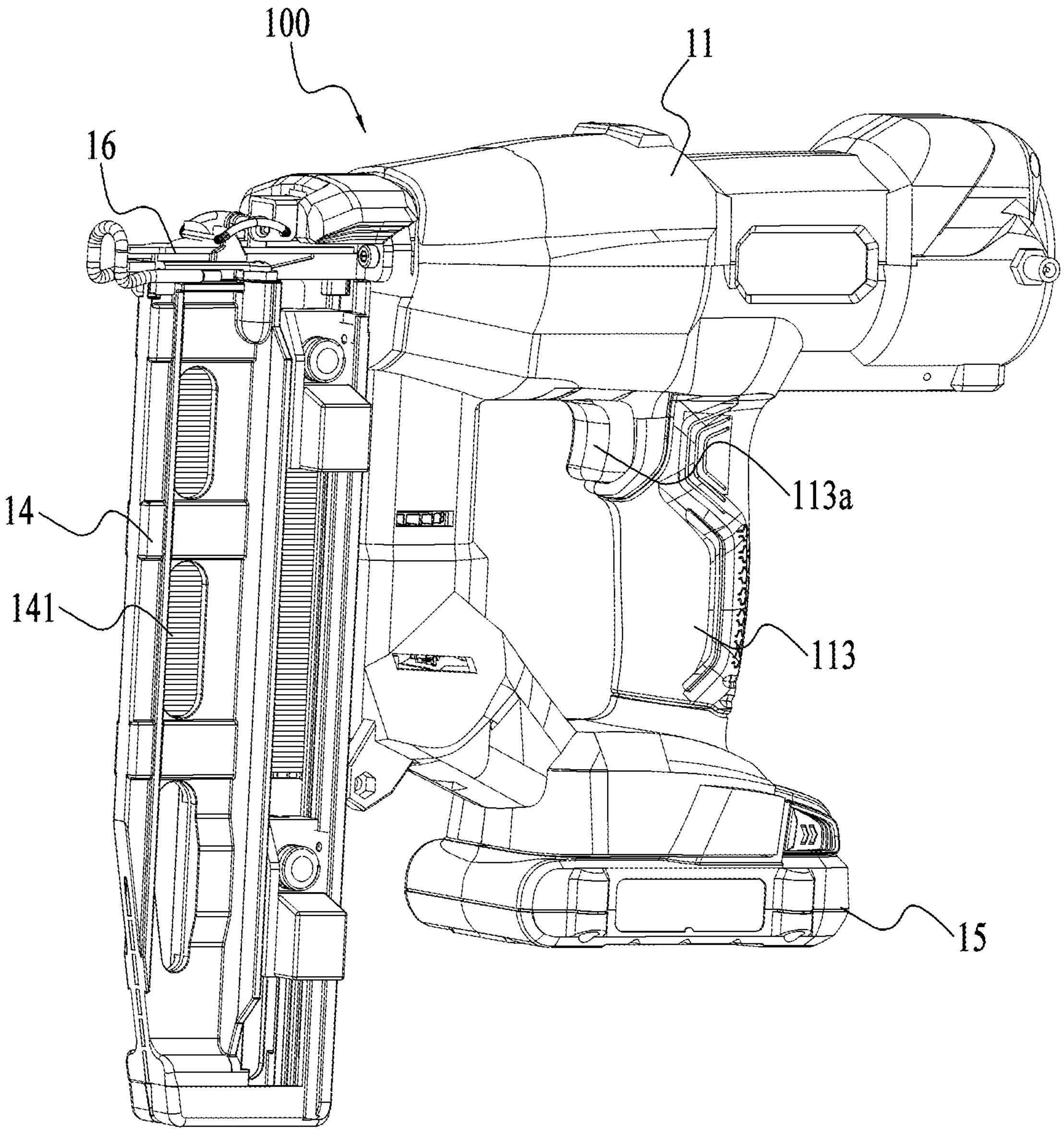
FIG. 1 is a perspective view of a nail gun.

A nail gun 100 shown in FIGS. 1 to 8 includes a housing 11, a power output assembly 12, a cylinder 13, a magazine assembly 14, a battery pack 15, and a firing assembly 16.

Figure 3:
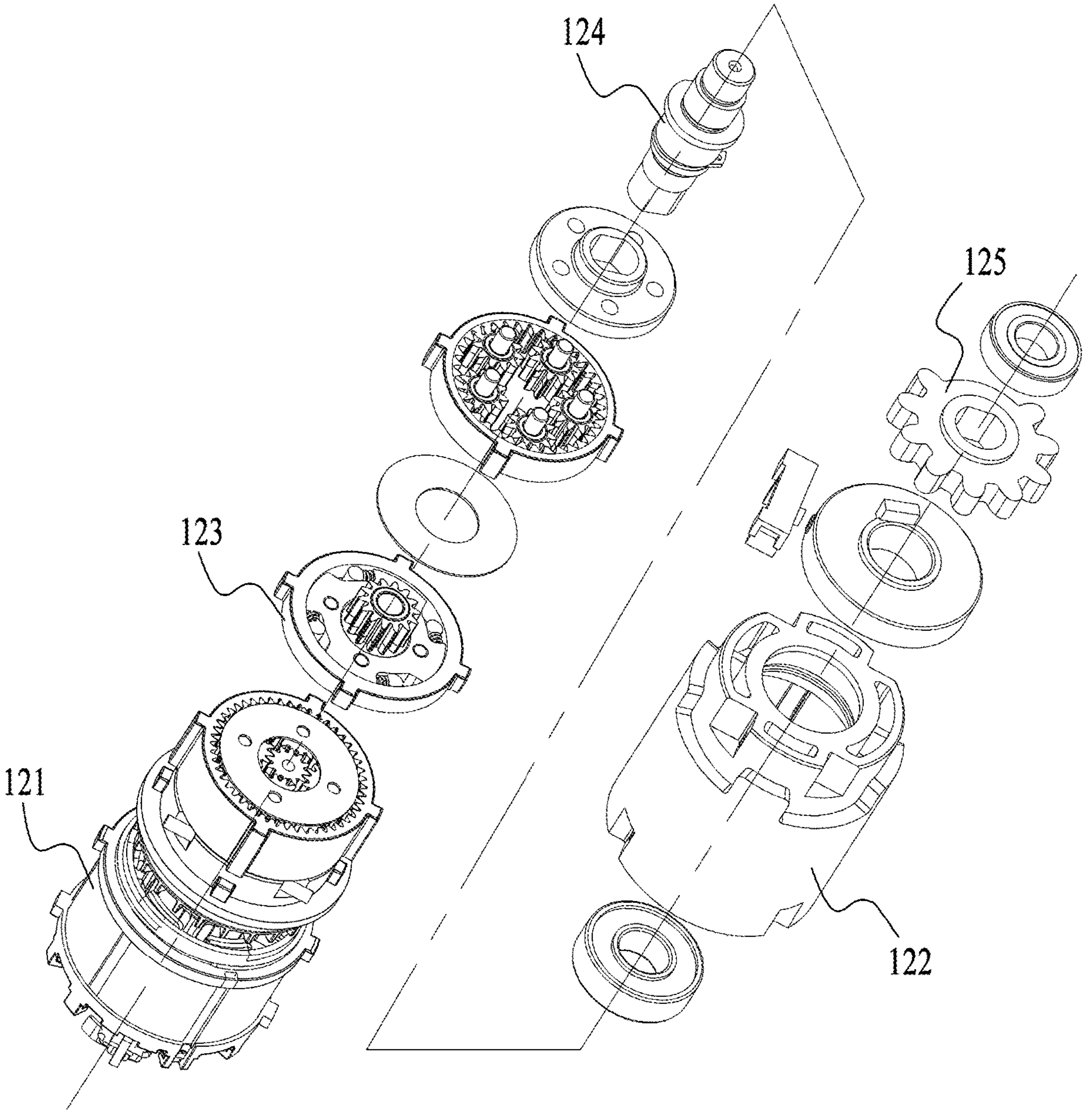
FIG. 3 is a structural view of a power output assembly of the nail gun in FIG. 2.

As shown in FIG. 3, the power output assembly 12 includes an electric motor 121, a gearbox 122, a back stopping assembly 123, an output shaft 124, and a drive wheel 125. The electric motor 121 can output power to the gearbox 122. After the transmission of the gearbox 122, the power continues being outputted to the output shaft 124, and the drive wheel 125 is disposed on the output shaft 124. For example, the electric motor 121, the gearbox 122, the back stopping assembly 123, the output shaft 124, and the drive wheel 125 are distributed along the direction of a first straight line 101. A transmission mechanism is disposed in the gearbox 122, and the back stopping assembly 123 is disposed in the gearbox 122 and is disposed at an end of the transmission mechanism or in the middle of the transmission mechanism. As an implementation, the back stopping assembly 123 allows the output shaft 124 to be capable of outputting a driving force only along a first rotation direction and limits the rotation of the output shaft 124 in a second rotation direction opposite to the first rotation direction.

Figure 4:
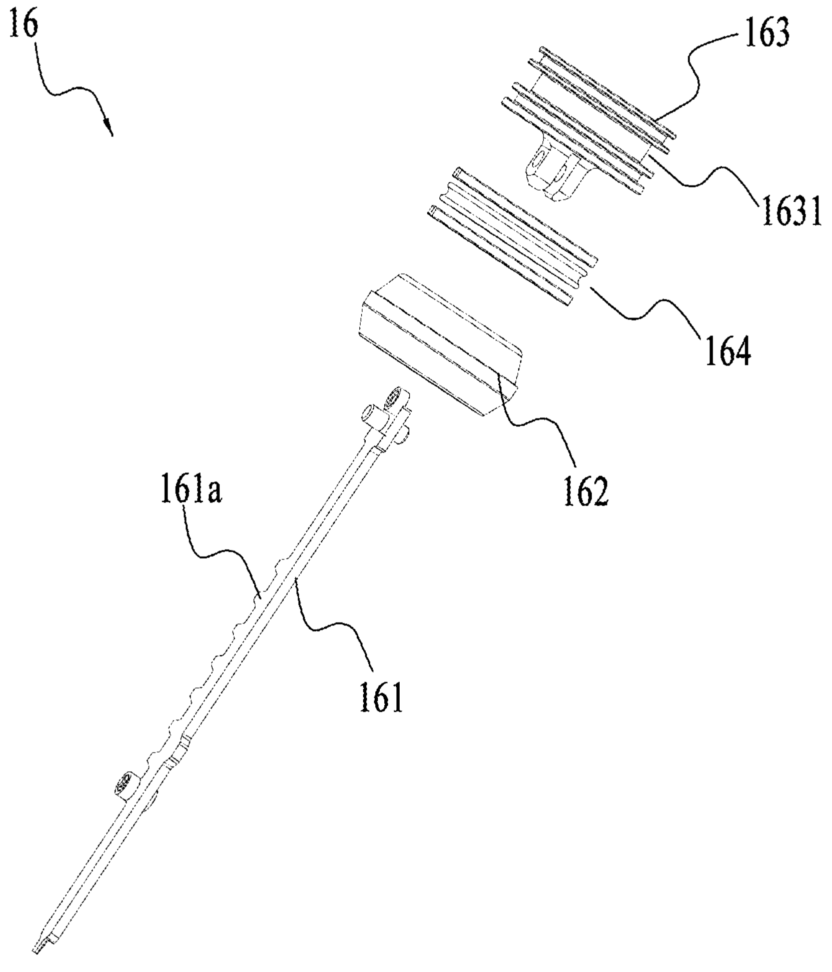
FIG. 4 is an exploded view of a firing assembly of the nail gun in FIG. 2.
Figure 5:
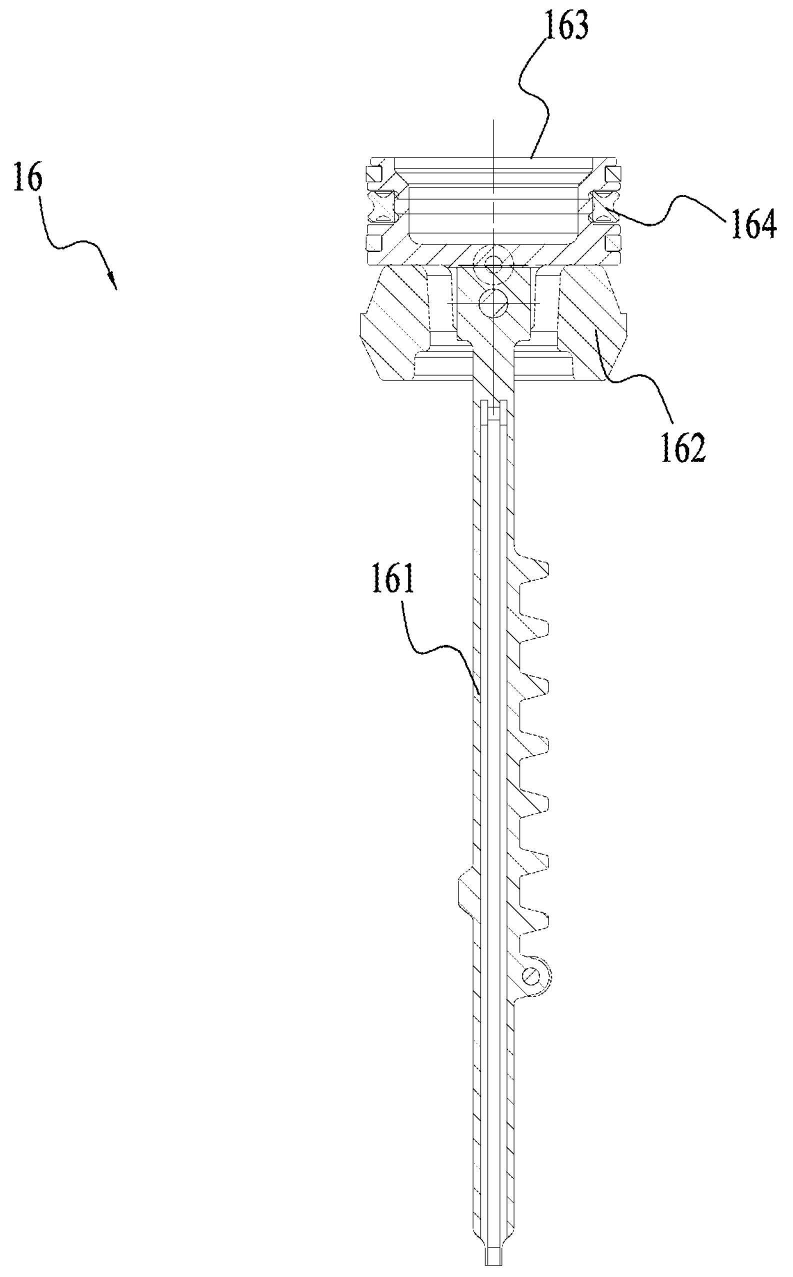
FIG. 5 is a sectional view of a firing assembly of the nail gun in FIG. 2.

As shown in FIG. 4 and FIG. 5, the firing assembly 16 includes a firing pin 161, a piston 162, and a metal member 163, where the firing pin 161 is fixed to the metal member 163, and the piston 162 is sleeved on the outer side of the metal member 163. A metal groove 1631 is disposed on the metal member 163 and a rubber ring 164 is sleeved on the metal groove 1631. Transmission teeth 161*a* are formed on the firing pin 161, and the transmission teeth 161*a* and the firing pin 161 can move along the direction of a second straight line 102 in the cylinder 13. The drive wheel 125 can mate with the transmission teeth 161*a* to drive the firing assembly 16 to work against air pressure in the cylinder 13 so that the firing assembly 16 can move into a firing position.

Figure 2:
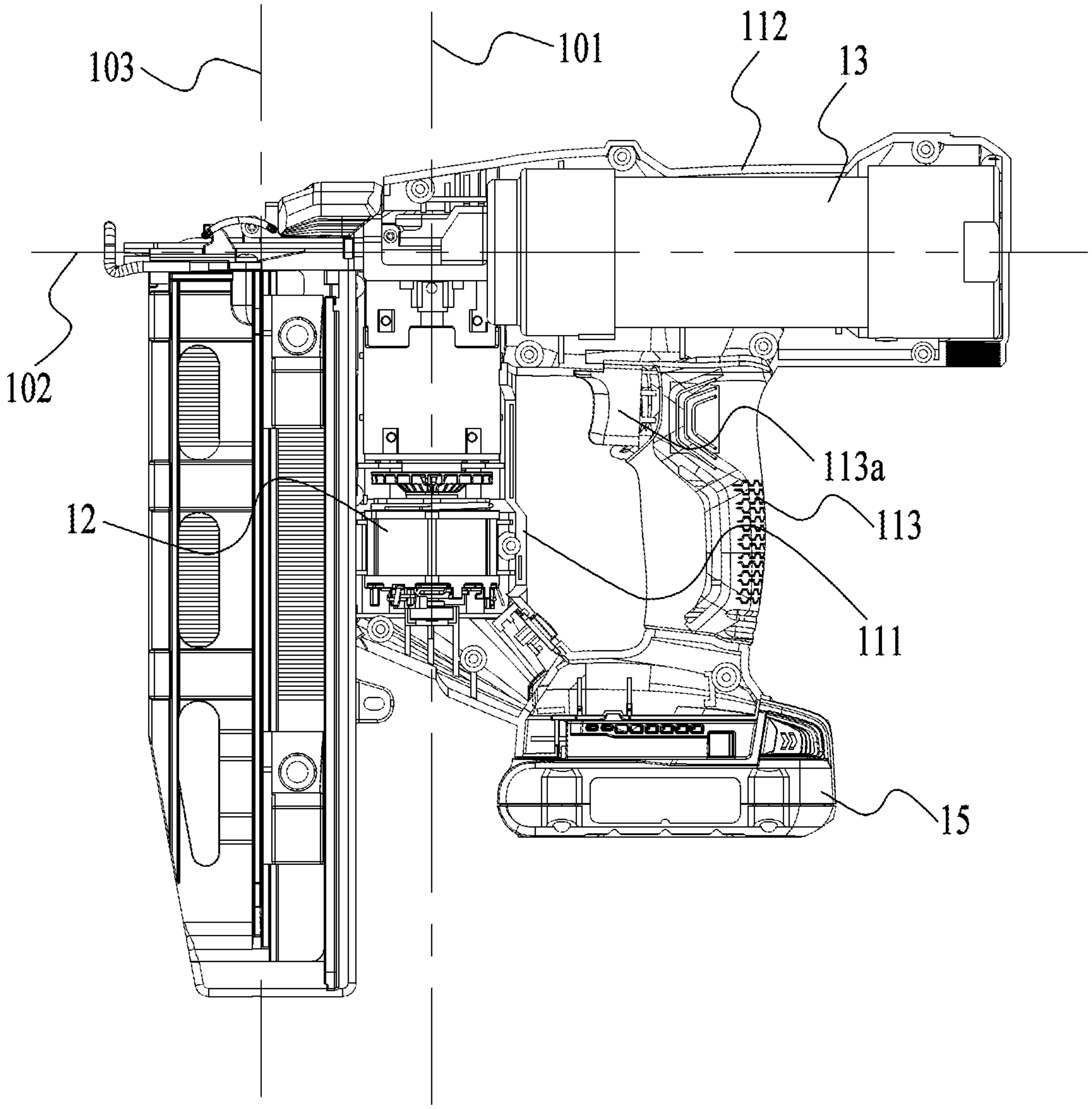
FIG. 2 is a sectional view of the nail gun in FIG. 1.

As shown in FIGS. 1 and 2, the housing 11 includes a first accommodating space 111 formed and extending along the direction of the first straight line 101 and a second accommodating space 112 formed and extending along the direction of the second straight line 102. The power output assembly 12 is disposed in the first accommodating space 111, and the cylinder 13 is disposed in the second accommodating space 112. The housing 11 is further formed with a handle 113 which can be held by a user. A power interface is connected to an end of the handle 113 and is configured to access a direct current power supply or an alternating current power supply. A main switch 113*a* is disposed on the handle 113, and the user controls, through the main switch 113*a*, the nail gun 100 to start or stop. In this example, the power interface is connected to the battery pack 15. The other end of the handle 113 is connected to the cylinder 13, and the cylinder 13 extends along the direction of the second straight line 102, where the first straight line 101 and the second straight line 102 are perpendicular to each other. The magazine assembly 14 is disposed in the direction of a third straight line 103 parallel to the first straight line 101. As an optional example, the magazine assembly 14 is further provided with a window 141 that allows the user to observe remaining nails. The window 141 is configured to be one or more gaps on the magazine assembly 14. On one hand, the window 141 may be used by the user to view the quantity of remaining nails, and on the other hand, the window 141 may be used by the user to perform simple maintenance on the magazine assembly 14 without detaching the magazine assembly 14. The firing assembly 16 is disposed in the cylinder 13, and gases in the cylinder 13 perform work so as to push the firing assembly 16 to move to drive out a nail. In this example, the cylinder 13 further includes an inflation nozzle used for inflating the gases into the cylinder 13 in advance. The power output assembly 12 drives the drive wheel 125 to rotate so that the firing assembly 16 is driven to compress the gases to move from an initial position to a firing position. In this case, the gases perform the work, and under the action of the gases inflated in advance, the firing assembly 16 is continuously pushed to have acceleration. Thus, the firing assembly 16 drives the nail out with relatively great kinetic energy, and after the nail is driven out, the firing assembly 16 quickly moves from the firing position to the initial position, thereby completing a nailing cycle.

It is to be understood that the firing assembly 16 may rebound upward for a short distance from a striking position due to a rebound force of a striking object when the firing assembly 16 drives the nail out. In the process where the firing assembly 16 rebounds, an impact between the firing pin 161 and the drive wheel 125 may be caused, so drive teeth of the drive wheel 125 and/or the transmission teeth on the firing pin 161 are abraded. To improve the preceding situation, the present application adjusts the structure of the drive wheel 125 and/or the structure of the firing pin 161, so as to avoid the case where when the firing pin 161 rebounds, the firing pin 161 impacts the drive wheel 125, causing the drive teeth and the transmission teeth to be abraded.

Figure 6:
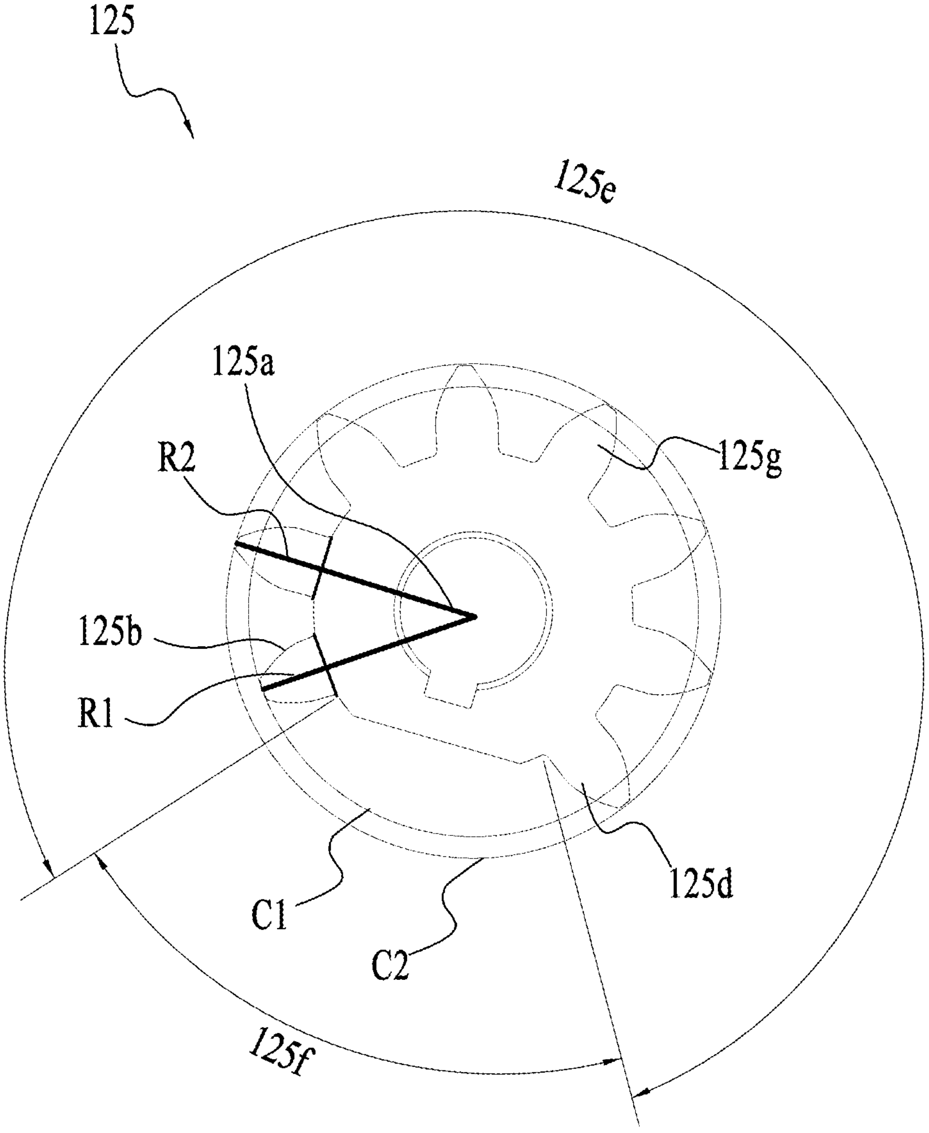
FIG. 6 is a perspective view of a drive wheel of the nail gun in FIG. 2.
Figure 7A:
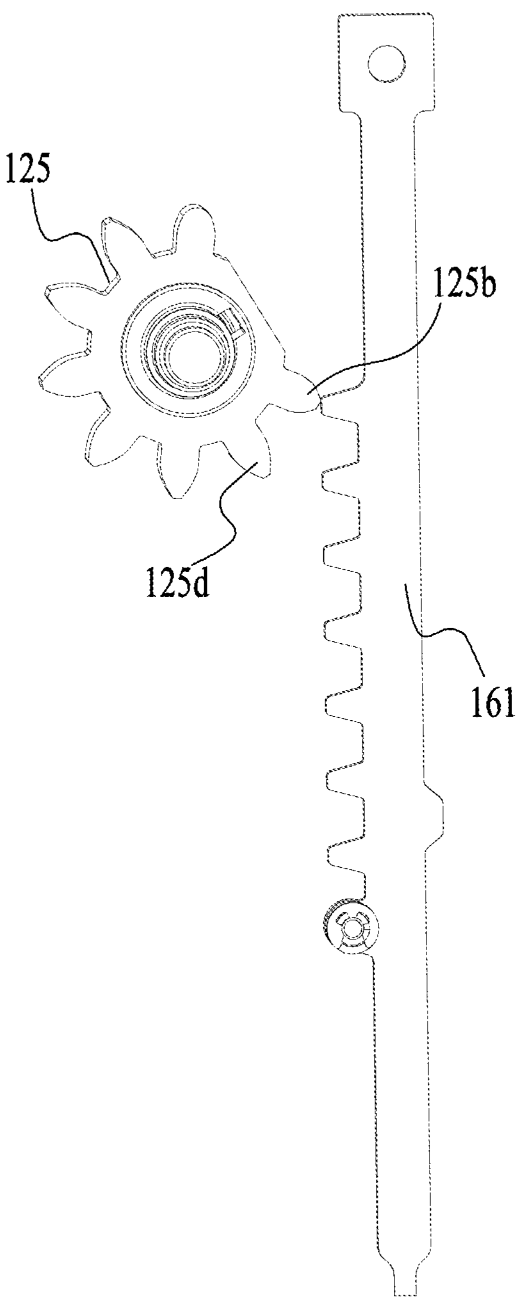
FIG. 7A is a schematic view of internal structures of the nail gun in FIG. 2 in a firing position.
Figure 7B:
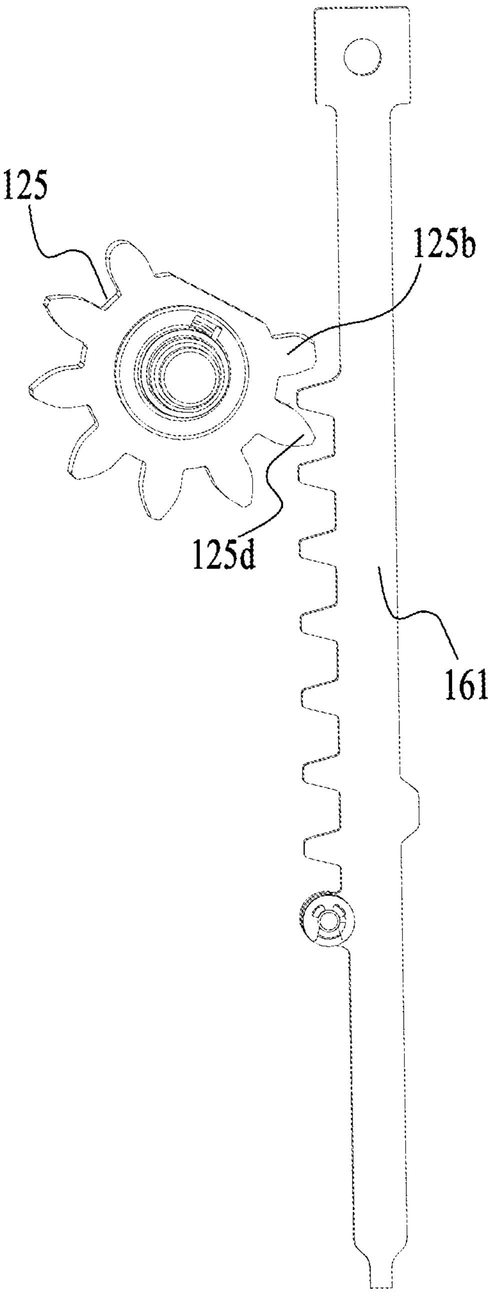
FIG. 7B is another schematic view of internal structures of the nail gun in FIG. 2 in a firing position.

In an example, as shown in FIG. 6, the drive wheel 125 is a gear structure. The drive wheel 125 is further formed with a connection hole 125*a* which can be connected to the output shaft 124. For example, the connection hole 125*a* is a flat hole, and when the output shaft 124 is connected to the connection hole 125*a*, the drive wheel 125 can rotate synchronously with the output shaft 124. Multiple drive teeth 125*g* are formed around the body of the drive wheel 125. The drive teeth 125*g* include a first drive tooth 125*b* disposed at a start end and other drive teeth 125*g* except the first drive tooth 125*b*. In the present application, a drive tooth except the first drive tooth 125*b* on the drive teeth 125 is referred to as a second drive tooth. Here, when the drive wheel 125 starts driving the firing assembly 16 to reset, the drive tooth 125*g* which first comes into contact with the firing pin 161 in the firing assembly 16 is the first drive tooth 125*b*, and the drive teeth except the first drive tooth 125*b* are second drive teeth 125*d*. The first drive tooth 125*b* and the second drive teeth 125*d* are uniformly distributed in a first section 125*e* of the drive wheel 125. A second section 125*f* of the drive wheel 125 is smooth and continuous, and no drive tooth 125*g* is distributed in the second section 125*f*. As shown in FIG. 7A and FIG. 7B, when the drive teeth 125*g* in the first section 125*e* mesh with the transmission teeth 161*a* on the firing pin 161, the drive wheel 125 can drive the firing pin 161 to compress the gases in the cylinder 13 to perform the work. When the first drive tooth 125*b* in the first section 125*e* starts meshing with a transmission tooth 161*a* on the firing pin 161, the drive wheel 125 starts driving the firing pin 161 to push the piston such that the gases in cylinder 13 are compressed to perform the work. When the second section 125*f* mates with the firing pin 161, because the second section 125*f* is smooth and continuous, the firing pin 161 is quickly pushed out by the gases in the cylinder 13 without being blocked by the drive teeth 125*g*, thereby implementing nailing.

It is to be understood that the transmission teeth 161*a* are distributed on a side of the firing pin 161 and can mesh with the drive teeth 125*g* of the drive wheel 125 so that the firing pin 161 can drive, under the drive of the drive wheel 125, the piston to compress the gases in the cylinder to perform the work.

In an example, the addendum circle C1 of the first drive tooth 125*b* and the addendum circle C2 of the second drive tooth 125*d* are shown in FIG. 6. The radius R1 of the addendum circle of the first drive tooth 125*b* of the drive wheel 125 is less than the radius R2 of the addendum circle of the second drive tooth 125*d*, where R1 and R2 are radii represented by bold solid lines in FIG. 6. In an implementation, the ratio of the radius R1 of the addendum circle of the first drive tooth 125*b* to the radius R2 of the addendum circle of the second drive tooth 125*d* is lower than 1. In an example, the ratio of R1 to R2 is higher than or equal to 0.5 and lower than 1. The length of the radius R1 of the addendum circle of the first drive tooth 125*b* is reduced so that an impact force of the transmission tooth 161*a* on the first drive tooth 125*b* is significantly reduced when the firing pin 161 moves upward due to the rebound force. Thus, the abrasion degree between the transmission tooth 161*a* and the first drive tooth 125*b* is reduced, and the case is avoided where the life of the whole machine is affected by the friction between the firing pin 161 and the drive wheel 125.

The drive tooth 125*g* and the transmission tooth 161*a* can mesh with each other, and a certain meshing length may exist between the drive tooth 125*g* and the transmission tooth 161*a*. The meshing length refers to the length of the contact surface between the drive tooth 125*g* and the transmission tooth 161*a* along the extension line of the tooth. As shown in FIG. 7A, when the firing pin 161 moves upward due to the rebound force, the first drive tooth 125*b* and the transmission tooth 161*a* cannot mesh with each other or the meshing length between the two teeth is relatively small. In an example, as shown in FIG. 7B, when the second drive tooth 125*d* and the transmission tooth 161*a* mesh with each other, the meshing length is relatively large.

Figure 8:
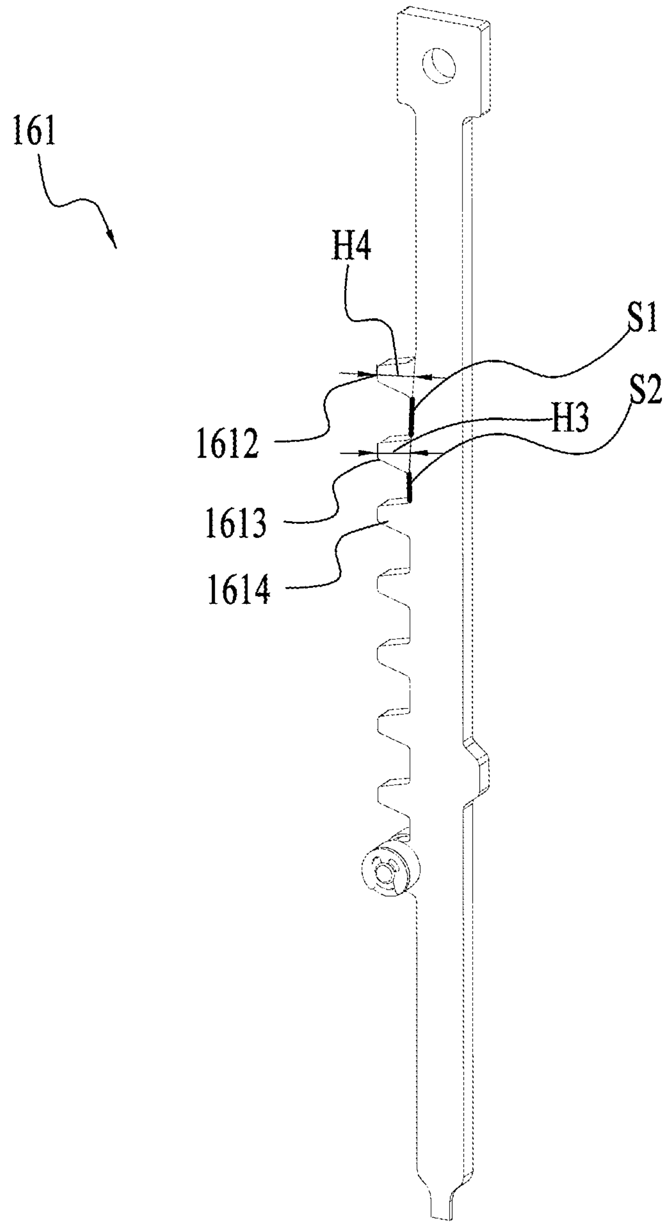
FIG. 8 is a structural view of a firing pin of the nail gun in FIG. 2.
Figure 9A:
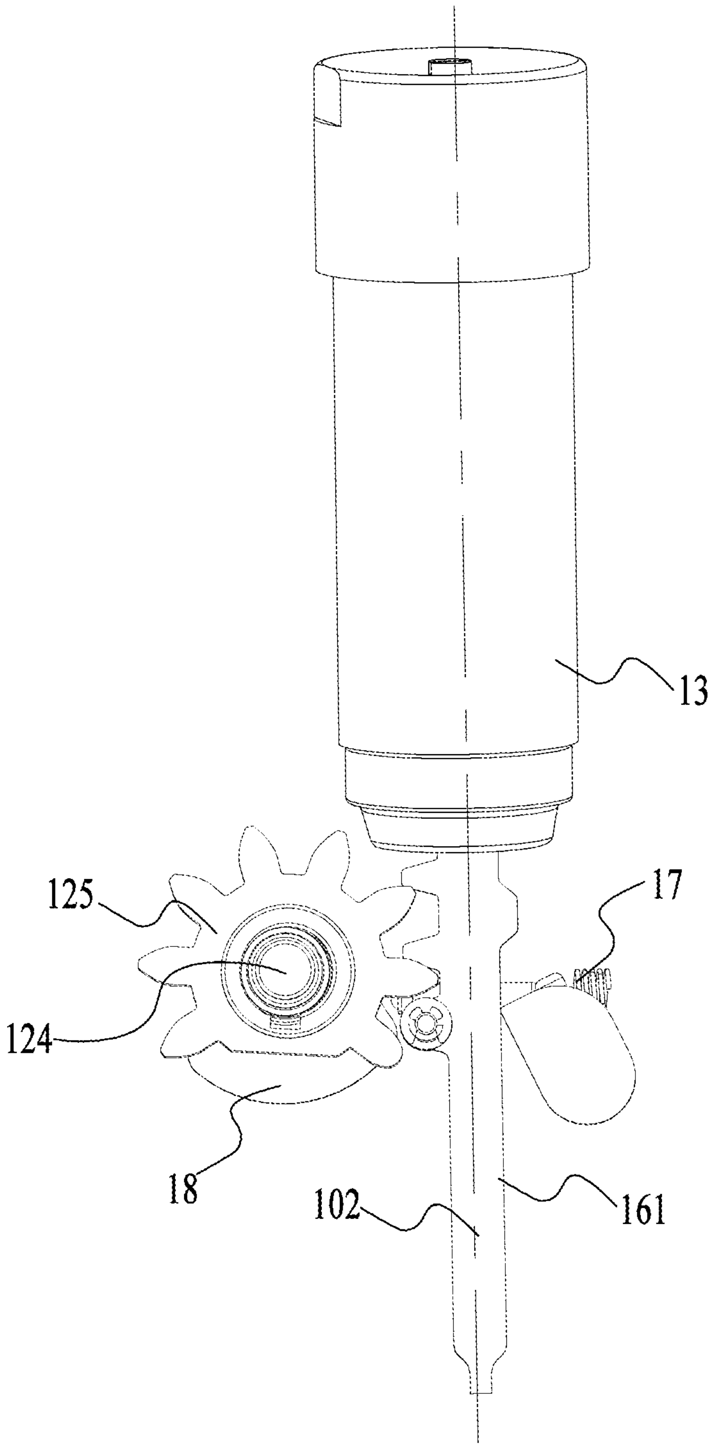
FIG. 9A is a schematic view of internal structures of the nail gun in FIG. 1 in an initial position.
Figure 9B:
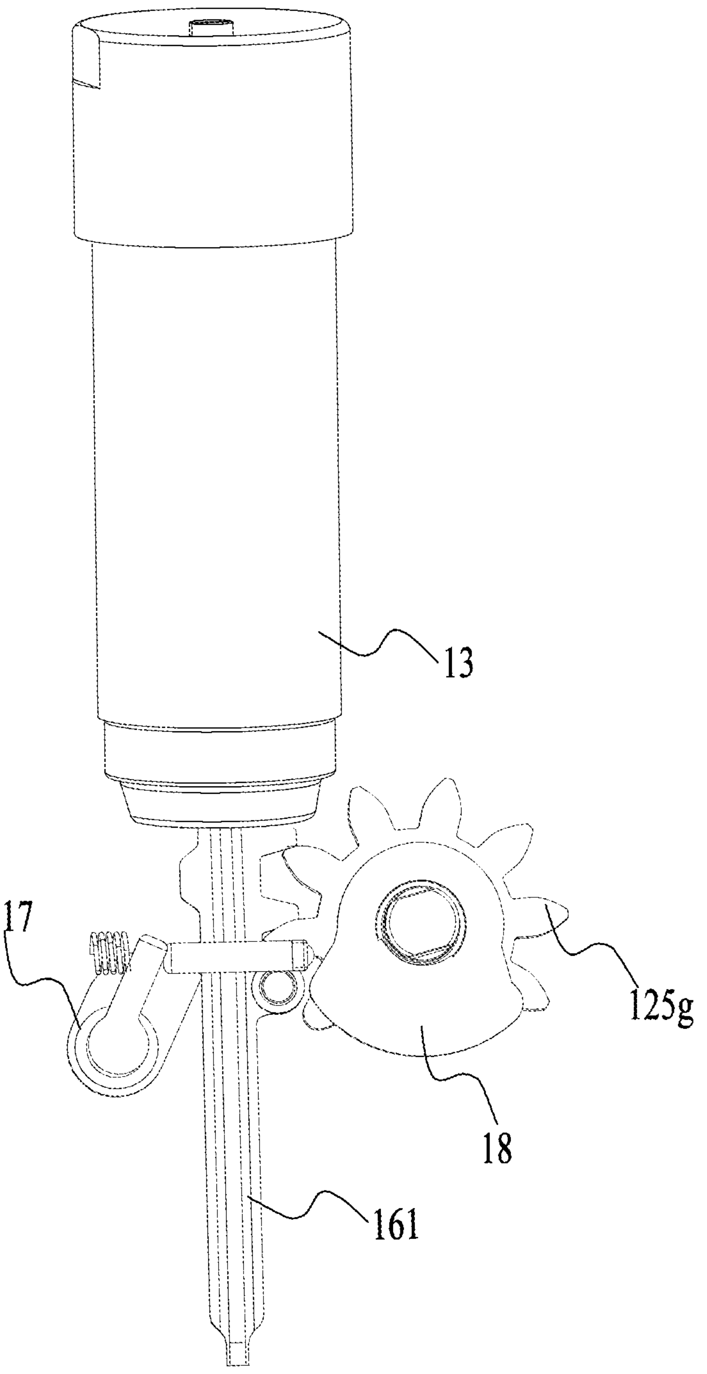
FIG. 9B is another schematic view of internal structures of the nail gun in FIG. 1 in an initial position.
Figure 10:
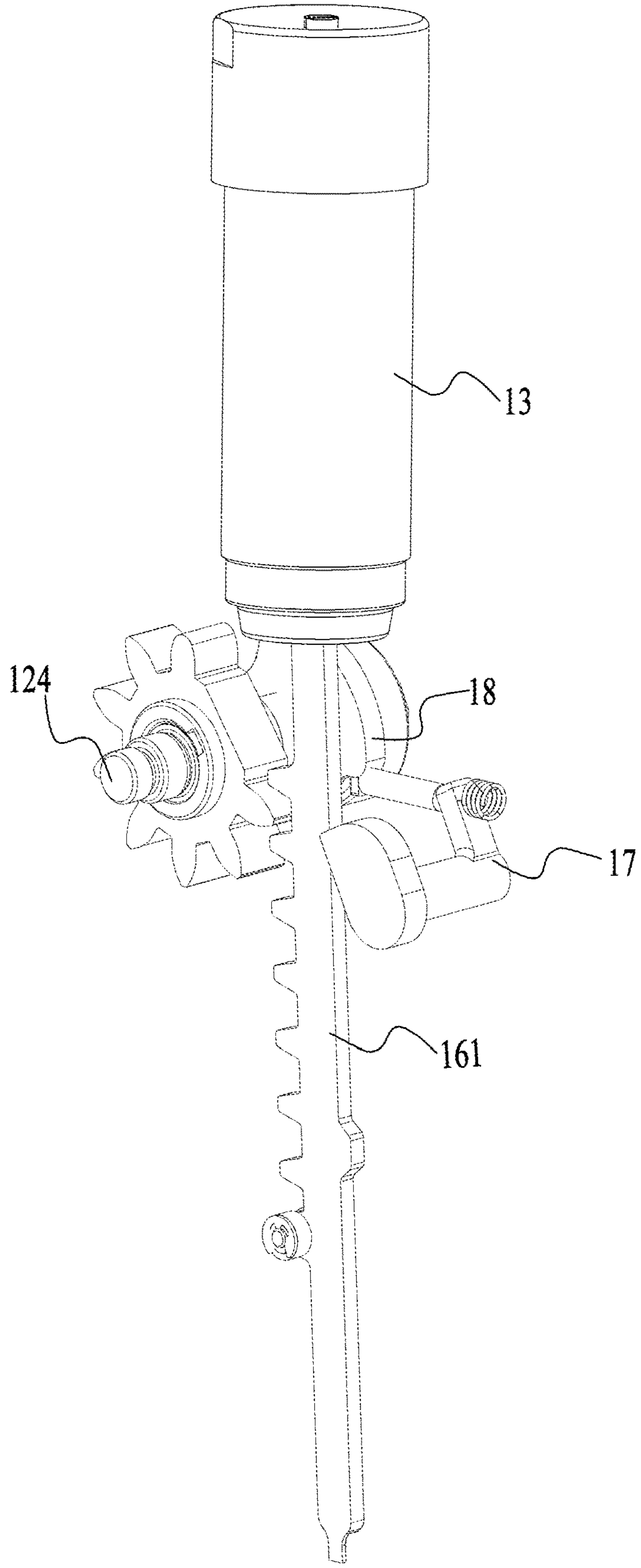
FIG. 10 is a schematic view of internal structures of the nail gun in FIG. 1 in a firing position.
Figure 11:
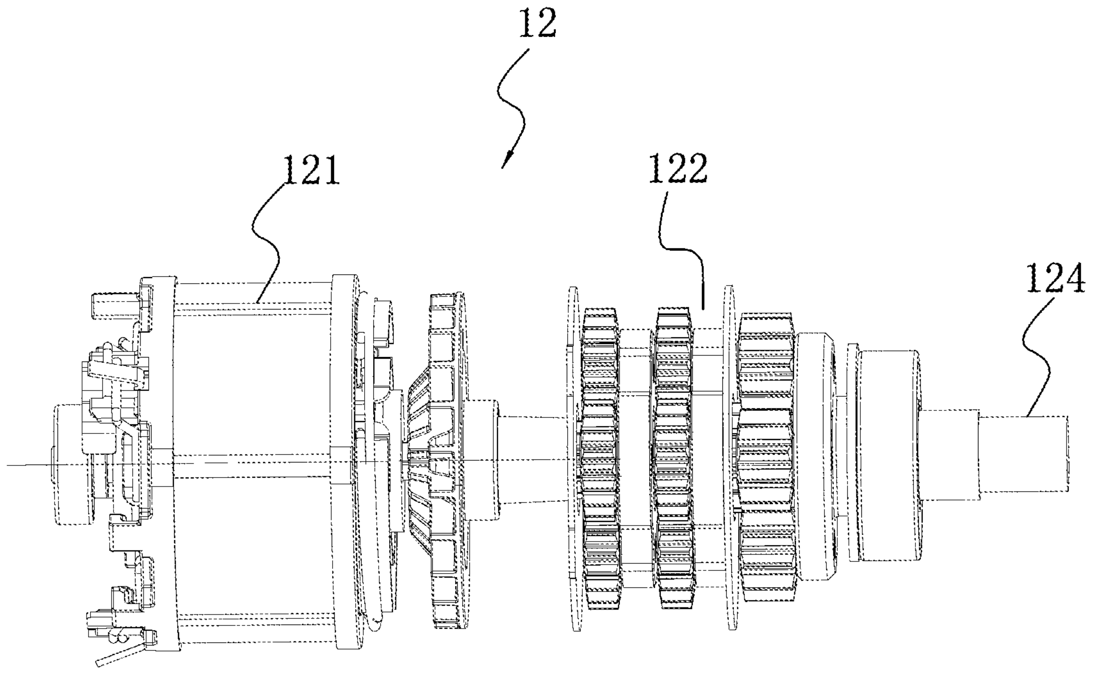
FIG. 11 is a structural view of a power output assembly of the nail gun in FIG. 2.
Figure 12:
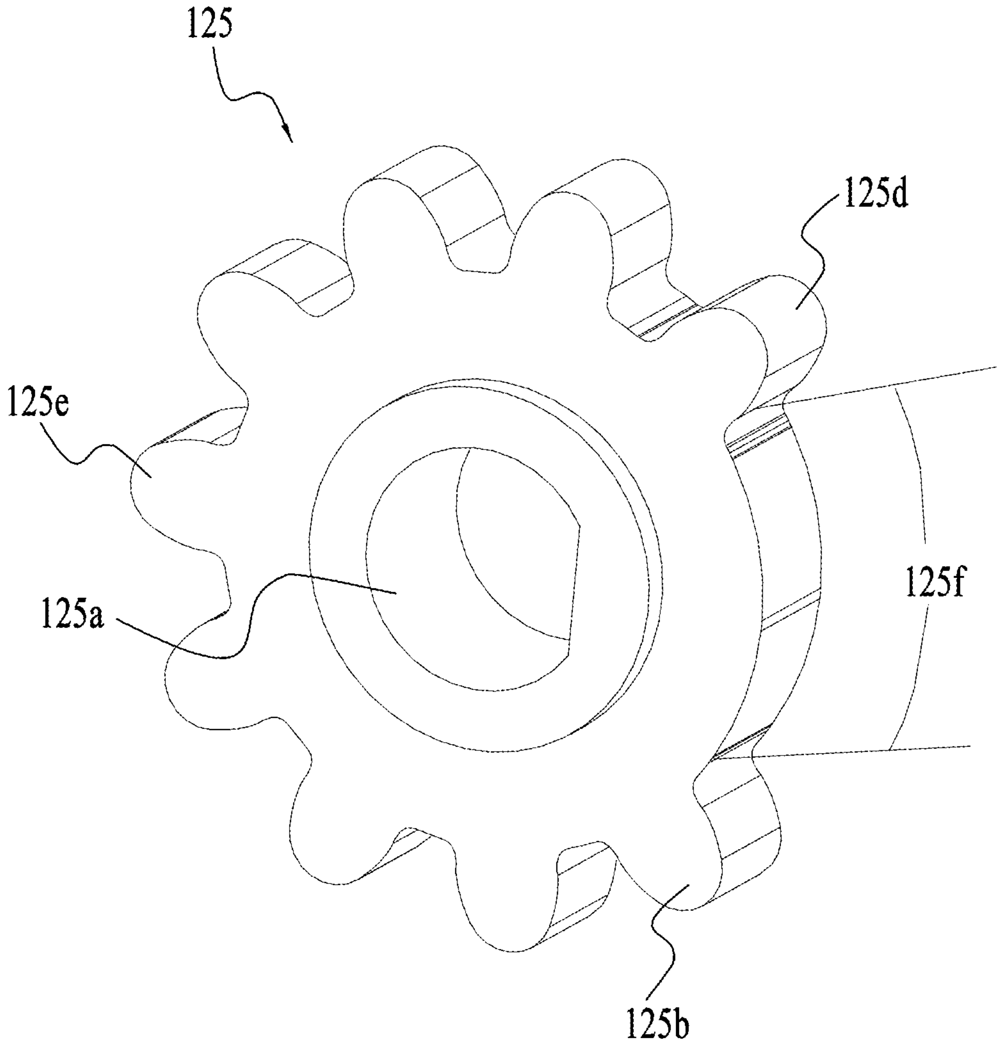
FIG. 12 is a perspective view of a drive wheel of the nail gun in FIG. 2.
Figure 13:
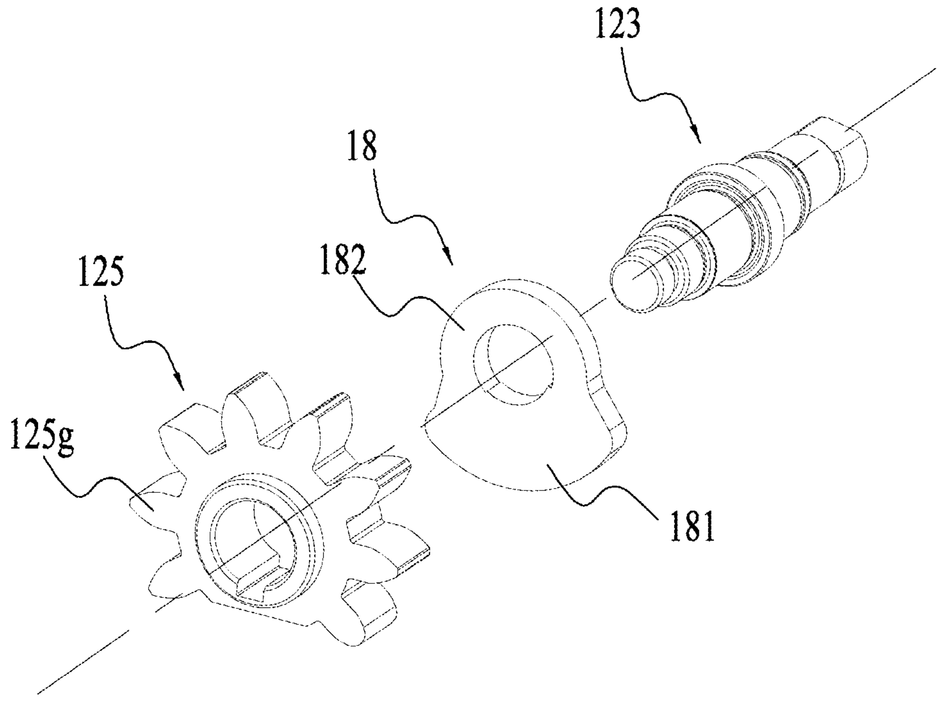
FIG. 13 is an exploded view of part of internal structures of the nail gun in FIG. 2.

In an example, a certain first difference exists between the radius of the addendum circle of the first drive tooth 125*b* and the radius of the addendum circle of the second drive tooth 125*d*, and a certain meshing length exists between the drive tooth on the drive wheel 125 except the first drive tooth 125*b* and a transmission tooth on the firing pin 161 except a second transmission tooth 1613. In an example, the ratio of the preceding first difference to the preceding meshing length is higher than or equal to 0.2 and lower than or equal to 0.7. For example, the ratio of the preceding first difference to the preceding meshing length is 0.2, 0.3, 0.4, 0.5, 0.6, or 0.7. In an example, as shown in FIG. 8, according to the distance between the transmission tooth 161*a* and the piston 162, the transmission teeth 161*a* of the firing pin 161 are sequentially defined as a first transmission tooth 1612, the second transmission tooth 1613, a third transmission tooth 1614, and the like. It is to be understood that in the process where the firing pin 161 moves from the firing position to the initial position, the first transmission tooth 1612 first meshes with the first drive tooth 125*b* of the drive wheel 125. That is to say, if the firing pin 161 drives the nail and then moves upward due to the rebound force, the second transmission tooth 1613 first impacts the first drive tooth 125*b*. In an implementation, the distance between the first transmission tooth 1612 and the second transmission tooth 1613 may be increased. For example, assuming that the distance between the first transmission tooth 1612 of the firing pin 161 and the second transmission tooth 1613 of the firing pin 161 is S1 and the distance between the second transmission tooth 1613 of the firing pin 161 and the third transmission tooth 1614 of the firing pin 161 is S2, S1 is greater than S2. In an example, the distance between other adjacent transmission teeth 161*a* except the first transmission tooth 1612 and the second transmission tooth 1613 is S2. The distance between the first transmission tooth 1612 and the second transmission tooth 1613 is increased so that in the process where the firing pin 161 drives the nail and then rebounds, the rebound force is converted into the driving force driving the firing pin 161 to move and is consumed in the process where the firing ping 161 moves the distance S1. Thus, the impact force between the drive wheel 125 and the firing pin 161 is avoided or reduced. In an implementation, the ratio of S1 to S2 is lower than 1. In an example, the ratio of S1 to S2 is higher than or equal to 0.5 and lower than 1. In an example, the distance between the first transmission tooth 1612 and the second transmission tooth 1613 may be increased according to the magnitude of pressure in the cylinder 13. For example, the higher the pressure in the cylinder 13, the greater the distance S1 set between the first transmission tooth 1612 and the second transmission tooth 1613. It is to be understood that in addition to the pressure in the cylinder 13, S1 is further related to the tooth thickness of the transmission tooth of the firing pin 161 or the modulus of the gear.

In an example, the tooth height H3 of the second transmission tooth 1613 of the firing pin 161 may be reduced, that is, the tooth height of the second transmission tooth 1613 is less than the tooth height of the first transmission tooth 1612 or the tooth height of the third transmission tooth 1614. Optionally, the second transmission tooth 1613 is the transmission tooth with a minimum tooth height among all the transmission teeth 161*a*. In the process where the firing pin 161 drives the nail and then rebounds, the firing pin 161 is driven by the rebound force to move upward. Since the second transmission tooth 1613 is relatively small, the first drive tooth 125*b* may impact or may not come into contact with the firing pin 161 in the process where the firing pin 161 moves upward. If the first drive tooth 125*b* is not in contact with the second transmission tooth 1613 in the process where the firing pin 161 moves upward, the impact force between the first drive tooth 125*b* and the third transmission tooth 1614 is significantly reduced after the firing pin is driven by the rebound force to move the distance S3. The distance S3 is the distance between the first transmission tooth 1612 and the third transmission tooth 1614, that is, S3=S1+S2. If the first drive tooth 125*b* and the second transmission tooth 1613 with a relatively low tooth height impact each other for the first time in the process where the firing pin 161 moves upward, the impact force does not cause relatively great abrasion on the drive wheel 125, but the rebound force is counteracted significantly. Thus, the case is avoided where the relatively great second impact force is caused between the first drive tooth 125*b* and the third transmission tooth 1614 and the service lives of the drive wheel 125 and the firing pin 161 are affected.

That is to say, the height of the second transmission tooth 1613 is reduced so that the distance which the firing pin 161 can be driven by the rebound force to move is increased in a different form. The distance is the distance between the first transmission tooth 1612 and the third transmission tooth 1614. Thus, the impact force between the first drive tooth 125*b* of the drive wheel 125 and the first transmission tooth 1612 of the firing pin 161 is avoided or reduced.

In an implementation, the ratio of the tooth height H3 of the second transmission tooth 1613 to the radius R1 of the addendum circle of the first drive tooth 125*b* is lower than 1. It is to be understood that the tooth height H4 of the second transmission tooth 1613 may be set according to the radius R1 of the addendum circle of the first drive tooth 125*b* as long as it needs to be ensured that the firing pin 161 can apply a relatively small impact force between the second transmission tooth 1613 and the first drive tooth 125*b*. That is to say, when the firing pin 161 rebounds upward, a certain impact force may also exist between the second transmission tooth 1613 and the first drive tooth 125*b* as long as the impact force is small enough so that no relatively large abrasion is caused by the impact force between the transmission tooth and/or the drive tooth.

In an example, a second difference exists between the tooth height of the first transmission tooth 1612 and the tooth height of the second transmission tooth 1613 or the tooth height of the third transmission tooth 1614, and the ratio of the difference to the preceding meshing length is lower than 1. For example, the ratio of the second difference to the preceding meshing length is 0.2, 0.3, 0.4, 0.5, 0.6, 0.7, or the like.

In an example, a controller of the electric motor may control the rotational speed of the electric motor to vary. For example, in the process where the drive wheel 125 drives the firing pin 161 to move from the initial position to the firing position, the controller controls the electric motor to reduce the rotational speed, or when the drive wheel 125 drives the firing pin 161 to move from the initial position to the firing position and start rising from the firing position to the initial position, the rotational speed of the electric motor is reduced. In general, the rotational speed of the electric motor may be reduced in the process in which the firing pin 161 is about to move upward or has moved upward so that the force with which the firing pin 161 rebounds up and down can be reduced.

In an example, the impact force between the drive wheel 125 and the firing pin 161 may be reduced in one manner or through the combination of multiple manners.

It is to be understood that if the firing assembly 16 is heavier, more work performed by the compressed gases in the cylinder 13 is used for working against the inertia of the firing assembly 16, so a striking force is significantly reduced. That is to say, the heavier the firing assembly 16, that is, the piston 162 and the firing pin 161, the worse the nailing effect of the nail gun.

Therefore, in the present application, the weight of the firing assembly 16 may be reduced so that the nailing effect of the nail gun is improved. Optionally, the firing needle 161 may be made of a relatively light material with a relatively hard texture, or the piston may be made of a lighter material with better anti-impact performance.

For example, the middle portion of the metal member 163 shown in FIG. 4 and FIG. 5 may be hollowed out so that the weight of the metal member 163 is reduced, thereby reducing the weight of the firing assembly 16.

In another example, referring to FIGS. 9A to 16, some structures in this example are the same as those in the preceding example and the same reference numerals are also used, and different reference numerals are used for different parts for differentiation.

Figure 16:
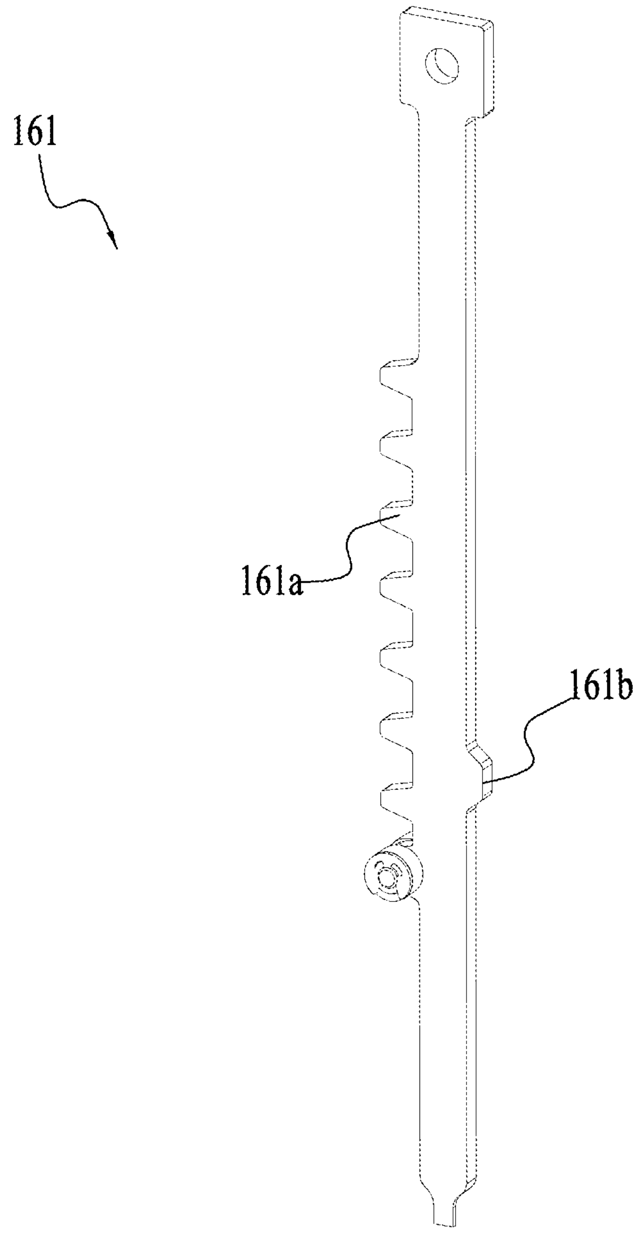
FIG. 16 is a structural view of a firing pin of the nail gun in FIG. 2.

In this example, the nail gun 100 may further include a first back stopping member 17 and a second back stopping member 18. The drive wheel 125 and the second back stopping member 18 are disposed on the output shaft 124. As shown in FIG. 16, the transmission teeth 161*a* are formed on one side of the firing pin 161, and a back stopping tooth 161*b* is formed on the other side of the firing pin 161. The piston and the firing pin 161 can move along the direction of the second straight line 102 in the cylinder 13. The drive wheel 125 can mate with the transmission teeth 161*a* to drive the firing assembly 16 to work against the air pressure in the cylinder 13 so that the firing assembly 16 can move into the firing position. The back stopping tooth 161*b* can cooperate with the first back stopping member 17 to lock the firing pin 161 in the initial position or near the initial position. For example, the electric motor 121, the gearbox 122, the output shaft 124, the second back stopping member 18, and the drive wheel 125 are distributed along the direction of the first straight line 101.

At the end of a nailing cycle, the firing assembly 16 is located in the initial position or near the initial position, and the first back stopping member 17 may lock the firing assembly 16 in the initial position or near the initial position. The movement of the firing assembly 16 from the initial position to the firing position can be blocked when no nail is driven. In the present application, the second back stopping member 18 may cooperate with the first back stopping member 17 to complete locking or unlocking the firing assembly 16. The implementation process is described below.

Figure 14:
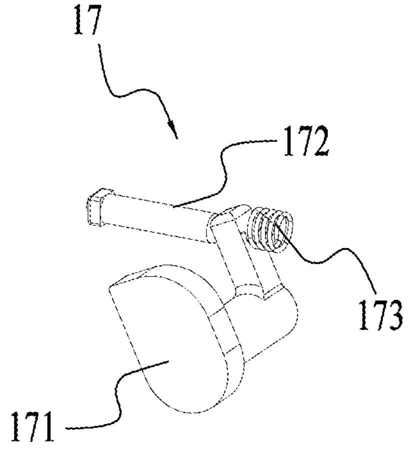
FIG. 14 is a structural view of a first back stopping member of the nail gun in FIG. 2.
Figure 15:
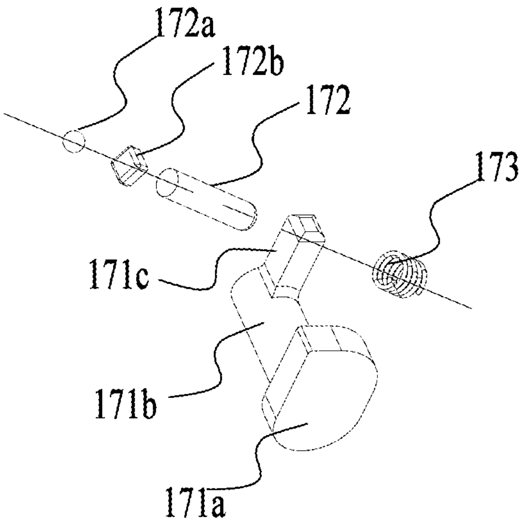
FIG. 15 is an exploded view of the first back stopping member in FIG. 14.

As shown in FIG. 14 and FIG. 15, the first back stopping member 17 includes a locking portion 171, a driven member 172, and an elastic member 173. When the firing assembly 16 is located in the initial position or near the initial position, the locking portion 171 locks the firing assembly 16. It may be understood that the second drive tooth 125*d* of the drive wheel 125 locks the firing pin 161 to prevent the firing pin 161 from falling down when the firing assembly 16 is located in the initial position or near the initial position while the first back stopping member 17 mainly prevents the firing pin 161 from sliding down when the locking effect of the drive wheel 125 fails. Therefore, the first back stopping member 17 may be considered to assist the drive wheel 125 in locking the firing pin 161. Further, when the firing assembly 16 is in a locked state and the drive wheel 125 continues rotating, the second section 125*f* of the drive wheel 125 is not in contact with the firing pin 161. In addition, since the driven member 172 is connected to the locking portion 171, the driven member 172 can be pushed by a protruding portion 181 of the second back stopping member 18. Thus, the locking portion 171 is driven to move away from the firing pin 161 to cooperate with the drive wheel 125 to unlock the firing assembly 16 so that the firing assembly 16 can shoot the nail from the initial position. Further, the elastic member 173 is connected to the locking portion 171. When the locking portion 171 is pushed by the driven member 172 to unlock the firing assembly 16, the elastic member 173 is in a compressed state. Thus, when a pushing force of the driven member 172 on the locking portion 171 disappears, the elastic portion 173 is released from the compressed state so that the locking portion 171 may be pushed to be in contact with the firing pin 161 again.

In an example, the locking portion 171 is an oddly-shaped structure which is integrally formed shown in FIG. 15, where the locking portion 171 has a protruding boss 171*a* which is in direct contact with the firing assembly 16, a cylindrical connection portion 171*b*, and a connection portion 171*c*. The driven member 172 and the elastic member 173 are fixed on two sides of an end of the connection portion 171*c* separately. The direction of the pushing force applied to the locking portion 171 by the driven member 172 is opposite to the direction of the elastic force applied to the locking portion 171 by the elastic member 173. In an example, the driven member 172 may be a cylindrical inserted pin, and the elastic member 173 may be a component with elasticity, such as a spring or a spring contact.

In an example, a contact 172*a* with a smooth and continuous surface may be disposed on the end of the driven member 172 facing away from the connection portion 171*c*. The contact 172*a* may be a metal ball and may be connected to the driven member 172 through a port 172*b*.

It is to be understood that during the rotation of the output shaft 124, when the second section 125*f* mates with the firing pin 161, the protruding portion 181 of the second back stopping member 18 abuts against the driven member 172 and the driven member 172 can be pushed by the protruding portion 181 to move so that the locking portion 171 is pushed away and is not in contact with the firing pin 161 and can cooperate with the drive wheel 125 to unlock the firing assembly 16. In addition, since the second section 125*f* is smooth and continuous, in the case where the drive tooth 125*g* or the locking portion 171 does not block the firing pin 161, the firing pin 161 is quickly pushed out by the gases in the cylinder 13, thereby implementing the nailing effect. When the drive teeth 125*g* in the first section 125*e* mesh with the transmission teeth 161*a* on the firing pin 161, a non-protruding portion 182 is no longer in contact with the driven member 172, and the elastic member 173 is released from the compressed state and can push the locking portion 171 to abut against the firing pin 161 again. Thus, after the firing pin 161 is driven by the drive teeth 125*g* in the first section 125*e* of the drive wheel 125 to move upward to the initial position, the locking portion 171 is in contact with the firing pin 161 and is located below the back stopping tooth 161*b*. In the process where the firing pin 161 moves upward from the firing position, the driving force of the drive wheel 125 to drive the transmission teeth 161*a* to rotate is greater than the elastic force applied to the locking portion 171 by the elastic member 173. Therefore, even if the locking portion 171 applies a certain resistance to the back stopping tooth 161*b* on the firing pin 161, the drive wheel 125 may drive the firing pin 161 to move upward.

In an implementation, in the process where the firing pin 161 moves upward from the firing position, to minimize the resistance of the locking portion 171 to the back stopping tooth 161*b*, the back stopping tooth 161*b* may be designed as a ratchet. A tooth tip of the ratchet is downward, which can ensure that in the process where the firing pin 161 moves upward, the firing pin 161 can easily slide over the ratchet when the locking portion 171 is above the back stopping tooth 161*b* and the firing pin 161 can be locked to be incapable of sliding down when the locking portion 171 is below the back stopping tooth 161*b*.

In the nail gun disclosed by the examples of the present application, the size or distance of the tooth on the drive wheel or the tooth on the firing pin is properly adjusted so that the impact between the drive wheel and the firing pin can be effectively avoided when the firing pin drives the nail and then rebounds, thereby ensuring the service life of the whole nail gun.

The main features of the present application are shown and described above. It is to be understood by those skilled in the art that the preceding examples do not limit the present application in any form, and all examples obtained through equivalent substitutions or equivalent transformations fall within the scope of the present application.

What is claimed is:

1. A nail gun, comprising:

a housing formed with an accommodating space;

a cylinder connected to the housing and used for storing gases;

a firing assembly, at least partially disposed in the cylinder, capable of moving from an initial position to a firing position in the cylinder to drive a nail, and comprising a piston disposed in the cylinder and a firing pin fixed to the piston;

a power output assembly disposed in the accommodating space and used for outputting a driving force to drive the firing assembly to move in the cylinder; and a drive wheel connected to an output shaft of the power output assembly and used for driving, under the drive of the power output assembly, the firing assembly to move in the cylinder;

wherein the drive wheel has a first drive tooth and second drive teeth, a radius of an addendum circle of the first drive tooth is less than a radius of an addendum circle of each of the second drive teeth, the first drive tooth is a drive tooth disposed at a start end of the drive wheel, and the first drive tooth meshes with the firing assembly when the drive wheel starts driving the firing assembly to reset, wherein a plurality of transmission teeth are disposed on the firing pin to mesh with drive teeth of the drive wheel and are driven by the drive wheel to move in the cylinder, the plurality of transmission teeth comprises a first transmission tooth, a second transmission tooth, and a third transmission tooth in sequence from nearer to the piston, and a distance between the second transmission tooth and the third transmission tooth is less than a distance between the first transmission tooth and the second transmission tooth.

2. The nail gun according to claim 1, wherein the second drive teeth are drive teeth on the drive wheel except the first drive tooth.

3. The nail gun according to claim 1, wherein a ratio of the radius of the addendum circle of the first drive tooth to the radius of the addendum circle of each of the second drive teeth is higher than or equal to 0.5 and lower than 1.

4. The nail gun according to claim 1, wherein a meshing length existing between a drive tooth on the drive wheel except the first drive tooth and a transmission tooth of the firing pin except the second transmission tooth is defined, a first difference exists between the radius of the addendum circle of the first drive tooth and the radius of the addendum circle of each of the second drive teeth, and a ratio of the first difference to the meshing length is higher than or equal to 0.2 and lower than or equal to 0.7.

5. The nail gun according to claim 1, wherein a tooth height of the second transmission tooth is less than a tooth height of the first transmission tooth or a tooth height of the third transmission tooth.

6. The nail gun according to claim 4, wherein a second difference exists between a tooth height of the first transmission tooth and a tooth height of the second transmission tooth, and a ratio of the second difference to the meshing length is lower than 1.

7. The nail gun according to claim 1, further comprising a first back stopping member, wherein the first back stopping member is used for blocking a movement of the firing assembly from the initial position to the firing position; and a second back stopping member, wherein the second back stopping member and the drive wheel are coaxially connected to the output shaft, and the second back stopping member cooperates with the first back stopping member to block the movement of the firing assembly from the initial position to the firing position.

8. The nail gun according to claim 7, wherein the second back stopping member is a cam with a protruding portion and a non-protruding portion.

9. The nail gun according to claim 8, wherein the drive wheel comprises a first section where a plurality of drive teeth are uniformly distributed and a smooth continuous second section, the protruding portion of the cam corresponds to the second section of the drive wheel in a axial direction of the output shaft, and the non-protruding portion of the cam corresponds to the first section of the drive wheel in the axial direction of the output shaft.

10. The nail gun according to claim 8, wherein a joint between the protruding portion of the cam and the non-protruding portion of the cam has a curved surface or a plane which is continuous and smooth.

11. The nail gun according to claim 8, wherein the first back stopping member comprises: a locking portion, wherein the locking portion locks the firing assembly when the firing assembly is located in the initial position or near the initial position; a driven member, wherein the driven member is capable of being pushed by the protruding portion of the cam to drive the locking portion to unlock the firing assembly so that the firing assembly is capable of moving from the initial position to the firing position to complete a firing action; and an elastic member connected to the locking portion and capable of pushing the locking portion to lock the firing assembly.

12. The nail gun according to claim 11, wherein a direction of a pushing force applied to the locking portion by the driven member is opposite to a direction of an elastic force applied to the locking portion by the elastic member.

13. The nail gun according to claim 11, wherein the elastic member comprises a spring or a spring contact.

14. A nail gun, comprising:

a housing formed with an accommodating space;

a cylinder connected to the housing and used for storing gases;

a firing assembly at least partially disposed in the cylinder and capable of moving from an initial position to a firing position in the cylinder to drive a nail;

a power output assembly disposed in the accommodating space and used for outputting a driving force to drive the firing assembly to move in the cylinder; and a drive wheel connected to an output shaft of the power output assembly and used for driving, under the drive of the power output assembly, the firing assembly to move in the cylinder;

wherein the drive wheel has a first drive tooth and second drive teeth, a ratio of a radius of an addendum circle of the first drive tooth to a radius of an addendum circle of each of the second drive teeth is higher than or equal to 0.5 and lower than 1, the first drive tooth is a drive tooth disposed at a start end of the drive wheel, and the first drive tooth meshes with the firing assembly when the drive wheel starts driving the firing assembly to reset, and wherein the firing assembly comprises a piston disposed in the cylinder and a firing pin fixed to the piston, a plurality of transmission teeth are disposed on a side of the firing pin, and a back stopping tooth is disposed on another side of the firing pin.

15. The nail gun according to claim 14, wherein the back stopping tooth is a ratchet, and a tooth tip of the ratchet faces the firing position.

* * * * *